United States Patent [19]

Lehtinen et al.

[11] Patent Number: 5,171,997
[45] Date of Patent: Dec. 15, 1992

[54] METHOD FOR THE CORRECTION OF AN ERROR CAUSED BY VARIATIONS IN THE SAMPLE VOLUME IN A LIQUID SCINTILLATION COUNTER

[75] Inventors: Kauko Lehtinen, Raisio; Tapio Yrjönen, Turku, both of Finland

[73] Assignee: Wallac Oy, Turku, Finland

[21] Appl. No.: 689,916

[22] PCT Filed: Dec. 1, 1989

[86] PCT No.: PCT/FI89/00220
§ 371 Date: May 31, 1991
§ 102(e) Date: May 31, 1991

[87] PCT Pub. No.: WO90/06526
PCT Pub. Date: Jun. 14, 1990

[30] Foreign Application Priority Data

Dec. 2, 1988 [FI] Finland ............................ 885615

[51] Int. Cl.⁵ .......................................... G01T 1/204
[52] U.S. Cl. .................................. 250/362; 250/328; 250/364
[58] Field of Search .................... 250/364, 362, 328

[56] References Cited

U.S. PATENT DOCUMENTS 5,039,860  8/1991  Yrjönen et al. ................. 250/328
5,061,853  10/1991  Lehtinen et al. ................ 250/328

Primary Examiner—Constantine Hannaher
Attorney, Agent, or Firm—Armstrong & Kubovcik

[57] ABSTRACT

The counting error due to variations in the counting efficiency as a function of the volume of the sample is corrected. The sample is placed into a sample container which is placed into a vertically positioned cylinder shaped counting chamber. Photomultiplier tubes are disposed on the opposite ends of the counting chamber. At least two of the following spectra are measured in the coincidence counting: the sum spectrum q observed by both of the photomultiplier tubes, the spectrum $q(y)$ observed by the upper photomultiplier tube and the spectrum $q(a)$ observed by the lower photomultiplier tube. The counting error is corrected by the correction coefficient obtained from these spectra.

18 Claims, 3 Drawing Sheets

METHOD FOR THE CORRECTION OF AN ERROR CAUSED BY VARIATIONS IN THE SAMPLE VOLUME IN A LIQUID SCINTILLATION COUNTER

BACKGROUND OF THE INVENTION

The object of the invention is a method for correcting an error due to variations in the sample volume in a liquid scintillation counter provided with a cylinder shaped optics. Such error is produced due to the dependence of the counting efficiency on the sample volume. The sample which is formed by dissolving a substance to be analyzed in a scintillation liquid and placing the dissolved substance into a transparent or translucent sample container inserted into a vertically positioned cylinder shaped counting chamber provided with photomultiplier tubes disposed on the opposite ends of the chamber and operating in coincidence.

Liquid scintillation counters are commonly used for counting samples which contain low energy beta or corresponding particles emitting radioactive isotopes such as tritium and carbon-14. The range of the low energy beta particles in the sample is generally, at the most, a few tens of micrometers. As a consequence, the specimen to be analyzed has to be dissolved into a scintillation liquid, in which the molecules of the isotope to be counted are close enough to the molecules of the scintillation substance so that the beta particles emitted by the isotope to be counted can interact with the molecules of the scintillation substance. In this interaction process, a part of the energy of the beta particle is transformed into light, which is converted to an electric pulse generally by means of two photomultiplier tubes which operate in coincidence. The purpose of the coincidence operation is the elimination of thermal noise of the photomultiplier tubes. The amplitude of the electric pulse is proportional to the energy of the beta particle interacted with the scintillation substance.

Because the energies of the emitted beta particles are distributed in a way characteristic of the beta decay of the isotope to be counted, a continuous spectrum corresponding to the energy distribution of the emitted beta particles is obtained by means of a multichannel analyzer incorporated in the counter. This continuous spectrum has certain characteristic properties e.g. total counts, number of counts in a certain "counting window" or channel region of the multichannel analyzer, end point, maximum value and center of mass, i.e. the centroid of the obtained spectrum. It can be determined in which channel of the multichannel analyzer the end point, the maximum value and the center of mass are located, i.e. the channel coordinates of these values can be determined.

A liquid scintillation counter provided with cylinder shaped optics is defined as a liquid scintillation counter in which the transparent or translucent sample container containing the specimen to be analyzed and the scintillation liquid is inserted in a vertically positioned cylindrical counting chamber with both ends open. The inner surface of the counting chamber itself is made of, or the surface is coated by, a light reflecting or scattering material. The purpose of the light reflecting or scattering inner surface of the counting chamber is to guide the scintillation photons produced by the absorption of the beta particle in the scintillation substance to the photomultiplier tube photocathodes placed at both open ends of the cylinder shaped counting chamber.

The counting efficiency of a liquid scintillation counter means denotes the probability of the counting system to detect the beta particles emitted by the sample to be analyzed. It has been observed in performed experiments that the counting efficiency of a conventional liquid scintillation counter as well as that of the liquid scintillation counter provided with cylinder shaped optics is dependent on the total volume of the specimen and the scintillation liquid in the sample container. As a consequence, to reach comparable results, the total volumes of the samples to be analyzed should always be same and in the separate containers exactly equal.

Because it is practically impossible to keep the sample volumes always equal, there is always an error in the observed count rate when the volume of the sample deviates from an optimal value. This is due to the fact that the light collecting efficiency of the cylinder shaped optics depends on the optical system formed by the sample, sample container, optics and the photocathodes of the photomultiplier tubes.

SUMMARY OF THE INVENTION

The object of the present invention is to produce a novel method for correcting variations in the counting efficiency depending on the sample volume, and correcting consequential counting error in a liquid scintillation counter provided with cylinder shaped optics. The method according to the present invention is characterized in that the counting error caused by the alteration of the counting efficiency as a function of the sample volume is corrected in such a way that at least two of the following spectra are measured from the sample in the coincidence counting: the sum spectrum observed by both photomultiplier tubes, the spectrum observed by the lower photomultiplier tube and the spectrum observed by the upper photomultiplier tube, and that the error in the result is corrected by employing a correction coefficient obtained by utilizing the information obtained from at least two of the measured spectra.

The inventors have observed in the performed experiments that the counting efficiency of the liquid scintillation counter provided with cylinder shaped optics is lower for small and large sample volumes than for medium volumes.

Another object of the invention is a liquid scintillation counter provided with cylinder shaped optics in order to carry out the method described above for the correction of the counting error, where the liquid scintillation counter is provided with a vertically positioned cylinder shaped counting chamber, a transparent or translucent sample container which can be inserted into the counting chamber and a pair of in coincidence operating photomultiplier tubes disposed on opposite sides (below and on the top of) of the counting chamber.

The liquid scintillation counter according to the present invention is characterized in that it is provided with a correction unit which has been programmed a theoretically or an experimentally derived correction function that corrects the obtained counting efficiency by utilizing at least two spectra obtained from the sample in coincidence counting: the sum spectrum observed by both photomultiplier tubes, the spectrum observed by the lower photomultiplier tube and the spectrum observed by the upper photomultiplier tube.

Here, as in the following description of the invention, the sample denotes the solution of the actual specimen to be analyzed and the scintillation substance, said solution being in the sample container.

Other characteristic features of the present invention will become apparent later in the patent claims.

BRIEF DESCRIPTION OF THE DRAWINGS

The present invention will be described in more detail below with reference to the attached drawings, wherein.

DESCRIPTION OF THE PREFERRED EMBODIMENTS

Figure 1:
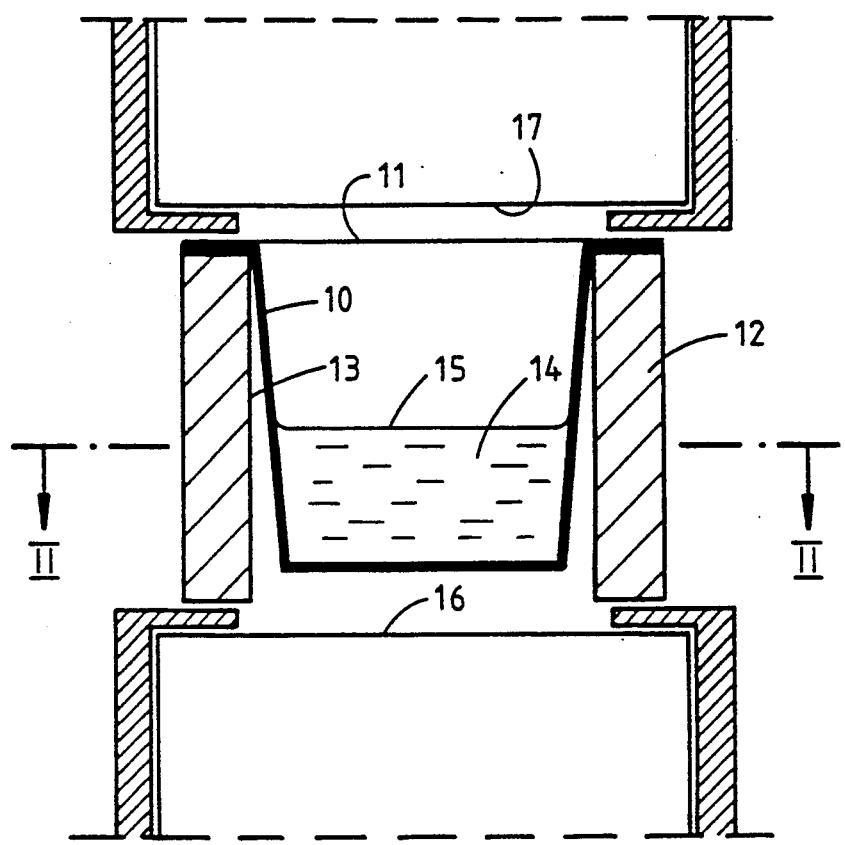
FIG. 1 is a diagrammatic front sectional view of the counting chamber in a liquid scintillation counter provided with a cylinder shaped optics in which the sample container containing the sample to be analyzed is placed.

Referring to FIG. 1, there is a sample container 10 produced from a transparent material such as clear or translucent glass or plastic placed in a counting chamber formed by a vertically positioned cylinder 12. Said sample container 10 is closed by a transparent lid 11 or sealed by a transparent adhesive tape 11. Said cylinder 12 or its inner surface 13 is produced from material which reflects or scatters the light emitted from the sample 14 as well as possible in order to guide the scintillation photons emitted from said liquid scintillation sample 14 as efficiently as possible to the photocathodes of the lower and upper photomultiplier tubes 17 and 16. The liquid surface of the sample 14 is denoted by number 15. The larger the volume of the sample 14 the higher said liquid surface. Curve 18 in FIG. 3 illustrates the counting efficiency as a function of the volume of the liquid.

Figure 2:
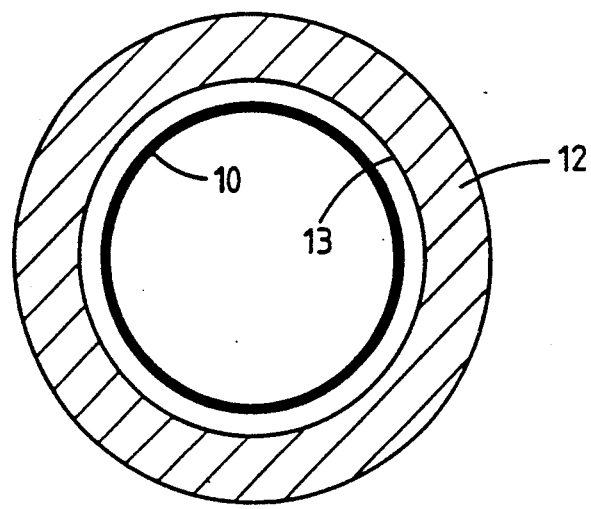
FIG. 2 is a cross sectional view taken along the line II—II in FIG. 1.

FIG. 2 illustrates the cross sectional view of a cylinder shaped optics and the location of the sample in it.

Figure 3:
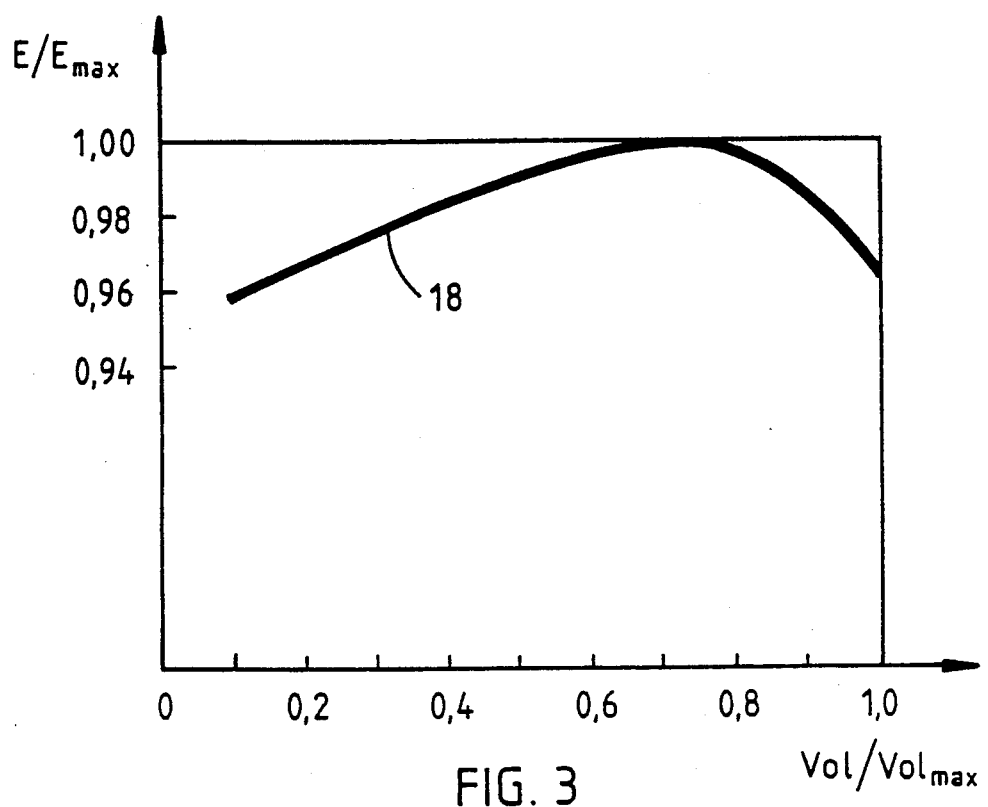
FIG. 3 is a diagram which illustrates the counting efficiency of the sample to be analyzed as a function of the sample volume.

It can be observed from FIG. 3 that the counting efficiency at first increases when sample volume increases but begins to decrease after a certain sample volume.

In FIG. 3
E = counting efficiency
$E_{max}$ = maximum counting efficiency
Vol = sample volume
$Vol_{max}$ = maximum sample volume.

Figure 4:
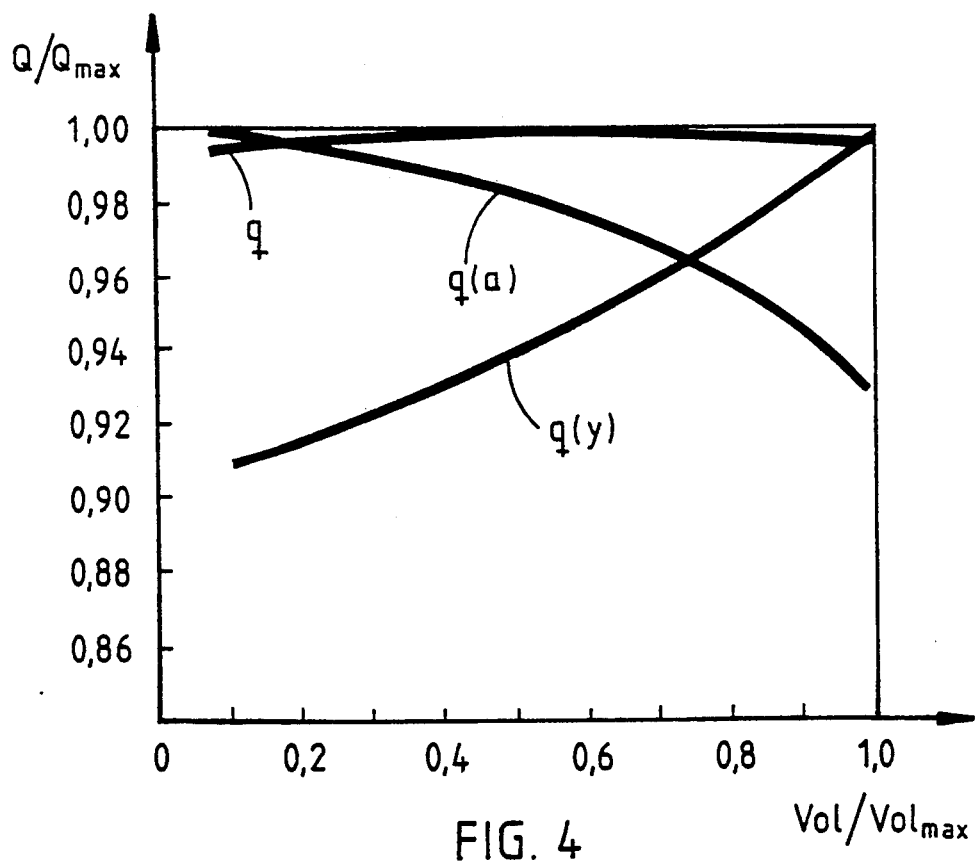
FIG. 4 is a diagram which illustrates the center of mass of the sum spectrum of both photomultiplier tubes and the center of masses of the spectra of the lower and the upper photomultiplier tubes as a function of the sample volume.

FIG. 4 illustrates in coincidence counting the dependencies of the channel coordinate q of the center of mass of the sum spectrum observed by both photomultiplier tubes, the channel coordinate q(a) of the center of mass of the spectrum observed by the lower photomultiplier tube 16 and the channel coordinate q(y) of the center of mass of the spectrum observed by the upper photomultiplier tube 17, on the volume of the sample 14, i.e. on the height of the liquid surface 15 of said sample 14.

In FIG. 4

Q = channel coordinate of the center of mass of the spectrum in coincidence counting
$Q_{max}$ = observed maximum value of Q
q = channel coordinate of the center of mass of the sum spectrum observed by both photomultiplier tubes in coincidence counting
q(y) = channel coordinate of the center of mass of the spectrum observed by the upper photomultiplier tube in coincidence counting
q(a) = channel coordinate of the center of mass of the spectrum observed by the lower photomultiplier tube in coincidence counting
Vol = sample volume
$Vol_{max}$ = maximum sample volume It can be observed from FIG. 4 that the channel coordinate q of the center of mass of the sum spectrum at first increases slightly when the volume of the sample 10 in sample container 14 increases but begins to decrease slightly after a certain sample volume has been reached. The channel coordinate q (a) of the center of mass of the spectrum observed by the lower photomultiplier tube 16 decreases, because the average distance of the sample 14 from the lower photomultiplier tube 16 increases when the volume of the sample 14 increases. The channel coordinate q(y) of the center of mass of the spectrum observed by the upper photomultiplier tube 17 behaves conversely: it increases when the volume of the sample increases, because the average distance of the sample 14 from the upper photomultiplier tube 17 decreases when the volume of the sample 14 increases.

Figure 5:
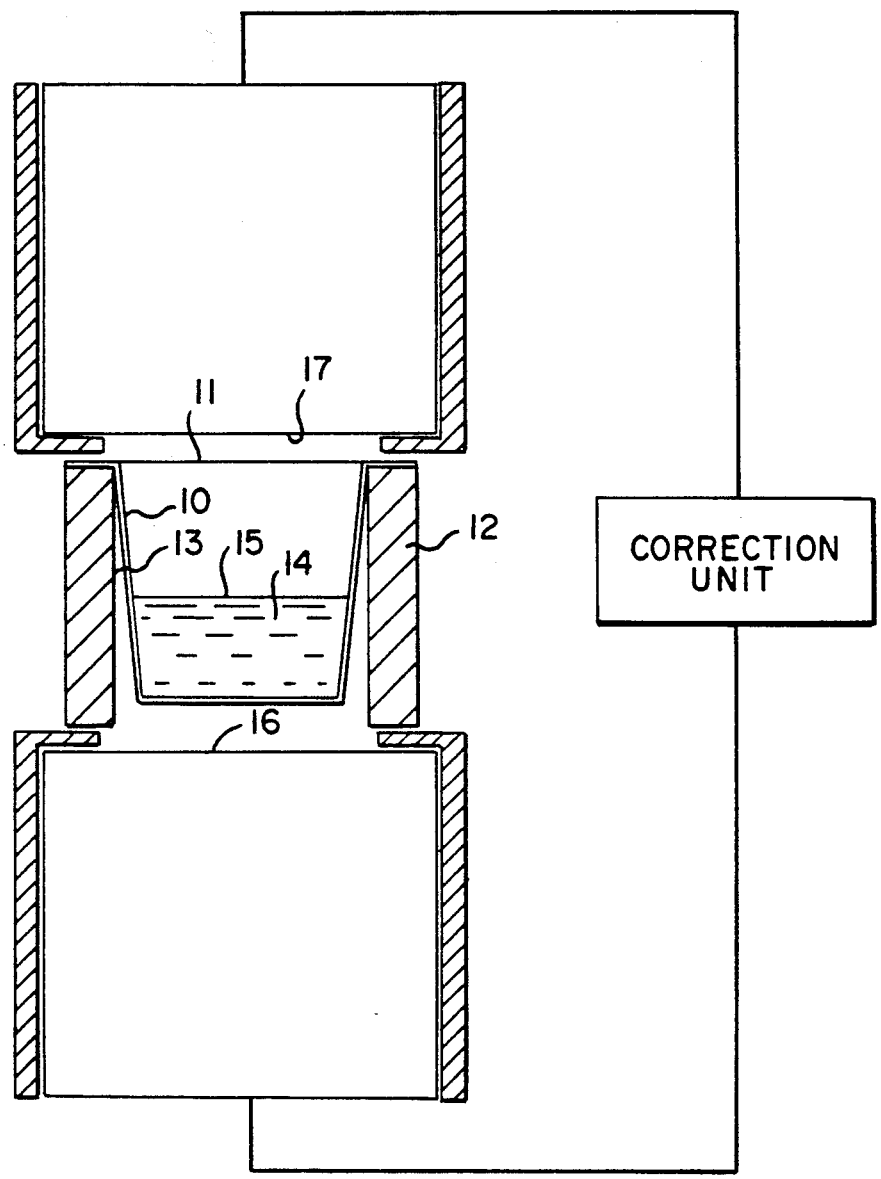
FIG. 5 is a diagrammatic front sectional view of the counting chamber connected to the correction unit.

By exploiting the dependence of the channel coordinate q of the center of mass of the sum spectrum observed by both photmultiplier tubes and the channel coordinate q(a) of the center of mass of the spectrum observed by the lower photomultiplier tube 16 and the channel coordinate q(y) of the center of mass of the spectrum observed by the upper photomultiplier tube 17 on the volume of the sample 14, the variation in the counting efficiency caused by the variation of the sample volume can be corrected in a correction unit (FIG. 5) by means of the following formula:

$$I_c = I*1/(1-k(q)*[q(y)-q(a)])$$  Formula 1:

where $I_c$ = corrected count rate of the sample
I = observed count rate of the sample
k(q) is a theoretically derived or experimental function of q.

Formula 1 corrects the observed count rate to a value corresponding to the sample volume observed equally by both of the photomultiplier tubes. According to the experiments performed by the inventors the counting efficiency in this case is highest possible.

The operational principle of the correction method is as follows:

The correction function k(q) is stored in a computer memory of the liquid scintillation counter. It is defined theoretically or by measuring standard samples with different sample volumes at different quench levels (q). From the sample to be analyzed are measured at least a) the count rate in the counting window of the multichannel analyzer, b) the channel coordinate q of the center of mass of the sum spectrum observed by both of the photomultiplier tubes, c) the channel coordinate q(a) of the center of mass of the spectrum observed by the lower photomultiplier tube and d) the channel coordinate q(y) of the center of mass of the spectrum observed by the upper photomultiplier tube.

After this, the corrected count rate of the sample is calculated using formula 1. It is important to notice that it is impossible to make the correction in question by using only the channel coordinate q of the sum spectrum of both photomultiplier tubes, although it changes slightly when the sample volume changes as shown in FIG. 4. The reason for this is that the channel coordinate q of the sum spectrum also changes as a function of the quench of the sample. Quenching means that the light which can be observed outside the sample container is reduced due to chemical impurities or colourness of the solution formed by the specimen to be analyzed and the scintillation substance.

The method according to the present invention is not confined to the above illustrated example, but contains all the correction methods within the scope of the patent claims for correcting the variations in the counting efficiency caused by variations in the sample volume in a liquid scintillation counter provided with the cylinder shaped optics. Namely, by means of the information illustrated in FIGS. 3 and 4 it is possible to derive several formulas corresponding formula 1, where said formulas do not necessarily simultaneously need q, q(y) and q(a), because for example q(a) and q(y) are behaving symmetrically as a function of the sample volume.

What is claimed is:

1. A method for measuring liquid scintillation, comprising:
    dissolving a specimen to be analyzed in a scintillation liquid;
    placing said dissolved specimen into a clear or translucent sample container;
    positioning said sample container with said dissolved specimen within a counting chamber having at least two photomultiplier tubes on opposite ends thereof;
    counting liquid scintillation photons of said dissolved specimen with said photomultiplier tubes to arrive at a measured scintillation count;
    measuring at least two spectra by coincidence counting of a plurality of spectra, said plurality of spectra comprising the sum spectrum detected by both photomultiplier tubes, the spectrum detected by a first one of said at least two photomultiplier tubes, and the spectrum detected by a second one of said at least two photomultiplier tubes;
    determining a correction coefficient based on said at least two measured spectra;
    correcting said measured scintillation count based on said correction coefficient.

2. The method of claim 1, wherein said correction coefficient is based on the center of mass of said at least two measured spectra.

3. The method of claim 2, wherein said measured scintillation count is multiplied by said correction coefficient, said correction coefficient defined by $1/(1-k(q)\{q(y)-q(a)\})$, where $k(q)$ is a theoretically or experimentally derived function of a quench level of said dissolved specimen, $q(y)$ is a channel coordinate of the center of mass of the spectrum observed by a first one of said at least two photomultiplier tubes, and $q(a)$ is a channel coordinate of the center of mass of the spectrum observed by a second one of said at least two photomultiplier tubes.

4. The method of claim 3, wherein said quench level is based at least in part on at least one of a colorness of the dissolved specimen and chemical impurities in the dissolved specimen.

5. The method of claim 1, wherein said at least two photomultiplier tubes comprise an upper photomultiplier tube and a lower photomultiplier tube.

6. The method of claim 1, wherein said counting chamber is vertically positioned and substantially cylindrical.

7. The method of claim 6, wherein said counting chamber comprises an inner reflecting surface for reflecting and scattering light within the counting chamber.

8. The method of claim 1, wherein said measured scintillation count differs from an actual scintillation of said dissolved specimen due at least in part to the volume of said dissolved specimen.

9. The method of claim 1, wherein, said sample container is covered by transparent adhesive tape or a transparent lid.

10. A liquid scintillation counter comprising:
    a counting chamber;
    a clear or translucent sample container for holding a dissolved specimen to be analyzed removably disposed within said counting chamber;
    at least two photomultiplier tubes disposed on opposite ends of said counting chamber for measuring liquid scintillation of said dissolved specimen to arrive at a measured scintillation count;
    a correction unit comprising means for correcting the measured scintillation with a correction coefficient based on at least two spectra obtained by coincidence counting of said dissolved specimen of a plurality of spectra, said plurality of spectra comprising the sum spectrum detected by both photomultiplier tubes, the spectrum detected by a first one of said at least two photomultiplier tubes, and the spectrum detected by a second one of said at least two photomultiplier tubes.

11. The counter of claim 10, wherein said correction coefficient is based on the center of mass of said at least two measured spectra.

12. The counter of claim 11, wherein said means for correcting multiplies said measured scintillation count by said correction coefficient, said correction coefficient defined by $1/(1-k(q)\{q(y)-q(a)\})$, where $k(q)$ is a theoretically or experimentally derived function of a quench level of said dissolved specimen, $q(y)$ is a channel coordinate of the center of mass of the spectrum observed by a first one of said at least two photomultiplier tubes, and $q(a)$ is a channel coordinate of the center of mass of the spectrum observed by a second one of said at least two photomultiplier tubes.

13. The counter of claim 12, wherein said quench level is based at least in part on at least one of a colorness of the dissolved specimen and chemical impurities in the dissolved specimen.

14. The counter of claim 10, wherein said at least two photomultiplier tubes comprise an upper photomultiplier tube and a lower photomultiplier tube.

15. The counter of claim 10, wherein said counting chamber is vertically positioned and substantially cylindrical.

16. The counter of claim 15, wherein said counting chamber comprises an inner reflecting surface for reflecting and scattering light within the counting chamber.

17. The counter of claim 10, wherein said measured scintillation count differs from an actual scintillation of said dissolved specimen due at least in part to the volume of said dissolved specimen.

18. The counter of claim 10, wherein, said sample container is covered by transparent adhesive tape or a transparent lid.

* * * * *